(12) United States Patent
Rayner (10) Patent No.: US 12,393,539 B2
(45) Date of Patent: Aug. 19, 2025

(54) SYSTEM AND METHOD FOR AN ADAPTIVE STORAGE MEDIA INTERFACE

(71) Applicant: ARRIS ENTERPRISES LLC, Suwanee, GA (US)

(72) Inventor: Iain Duncan Rayner, Bradford (GB)

(73) Assignee: ARRIS ENTERPRISES LLC, Horsham, PA (US)

( * ) Notice: Subject to any disclaimer, the term of this patent is extended or adjusted under 35 U.S.C. 154(b) by 199 days.

(21) Appl. No.: 18/266,391

(22) PCT Filed: Oct. 25, 2021

(86) PCT No.: PCT/US2021/056475
§ 371 (c)(1),
(2) Date: Jun. 9, 2023

(87) PCT Pub. No.: WO2022/125202
PCT Pub. Date: Jun. 16, 2022

(65) Prior Publication Data
US 2024/0054087 A1 Feb. 15, 2024

Related U.S. Application Data

(60) Provisional application No. 63/124,680, filed on Dec. 11, 2020.

(51) Int. Cl.
*G06F 13/38* (2006.01)
*G06F 13/40* (2006.01)
*G06F 13/42* (2006.01)

(52) U.S. Cl.
CPC ........ *G06F 13/385* (2013.01); *G06F 13/4027* (2013.01); *G06F 13/4282* (2013.01)

(58) Field of Classification Search
None
See application file for complete search history.

(56) References Cited

U.S. PATENT DOCUMENTS 8,924,749 B2 12/2014 Intrater
10,152,447 B2 * 12/2018 Lai ...................... G06F 13/4081
(Continued)

FOREIGN PATENT DOCUMENTS

JP 2015167402 A 9/2015

OTHER PUBLICATIONS

International Search Report, and Written Opinion dated Jan. 31, 2022, issued in corresponding International Application No. PCT/US21/56475, 7 pages.

*Primary Examiner* — Henry Tsai
*Assistant Examiner* — Aurangzeb Hassan
(74) *Attorney, Agent, or Firm* — Panitch Schwarze Belisario & Nadel LLP (57) ABSTRACT

A system and method for automatically adapting the data protocol employed by a storage device to communicate with a mated media gateway device ("HMS"). The system and method utilize particular protocol conversions and data path switching in response to the detection of the particular protocol employed by the HMS. The technology enables a single type of storage device to be mated with a variety of HMSs, and autonomously adapt so as to establish and facilitate streaming data communications with the particular mated HMS. This enables a single storage device design to be utilized throughout a network of dissimilar HMSs.

20 Claims, 5 Drawing Sheets

(56) References Cited

U.S. PATENT DOCUMENTS

| | | | |
|---|---|---|---|
| 2009/0245245 A1* | 10/2009 | Malwankar | G06F 13/4059 |
| | | | 375/240 |
| 2016/0299860 A1* | 10/2016 | Harriman | G06F 13/4282 |
| 2018/0070129 A1 | 3/2018 | Cholas et al. | |
| 2018/0275901 A1* | 9/2018 | Asmussen | G06F 3/0661 |
| 2019/0155239 A1* | 5/2019 | Salhuana | G06F 8/456 |
| 2019/0354502 A1* | 11/2019 | Ben-Chen | G06F 11/1004 |
| 2021/0286752 A1* | 9/2021 | Modukuri | G06F 13/4022 |
| 2022/0179814 A1* | 6/2022 | Mishra | G06F 13/385 |

\* cited by examiner

SYSTEM AND METHOD FOR AN ADAPTIVE STORAGE MEDIA INTERFACE

BACKGROUND OF THE INVENTION

The delivery of media services to residential environments, via cable, optical or satellite networks, continues to expand. As the number of households availing themselves of these services grows, it can place an increased burden upon the service providers human resources, and in particular upon the technicians available to be dispatched for residential locations to perform premises equipment installation and service. Consequently, it has been advantageous for service providers to supply their subscribing customers with premises equipment that can be installed with little or no assistance form service provider technicians. This do-it-yourself installation is primarily a matter of designing and providing equipment that has a minimal number of ports, connectors, buttons and selectors that a given subscriber would need to concern themselves with during installation, and ensuring that the equipment autonomously performs as many of the processes required for installation as possible.

The provision of premises equipment capable of performing autonomous or semi-autonomous installation processes can become problematic if the installation environment is not homogenous. If the network and/or the pre-existing premises equipment constituting the installation environment varies from one residential site to another, it can become very difficult to address such variations in a cost-effective manner with a single, premises equipment design and still avoid the need for a technician's assistance, with some of the most troublesome being the consequence of efforts by a service provider to upgrade or modernize a network. As a given upgrade is rolled out across a service environment, it will be almost unavoidable to have some residences with one type of hardware (the older premises equipment) and others with a different type (the upgraded hardware).

Consequently, it would be advantageous to provide for an equipment interface that could adaptively mate with a variety of premises equipment types or versions. The interface would provide and accept data streams conforming to the particular protocol(s) utilized by the particular premises equipment with which it was mated. For example, data protocols such as Universal Serial Bus ("USB") 2.0, USB 3.0, and Serial AT Attachment ("SATA"). Ideally, this adaptation would be performed independent of any user action or intervention outside of connecting the adaptive interface upon the new equipment to the pre-existing installation environment.

BRIEF SUMMARY OF THE INVENTION

A system and method for automatically adapting the data protocol employed by a storage device to communicate with a mated Home Media System (HMS). The system and method utilize particular protocol conversions and data path switching in response to the detection of the particular protocol employed by the HMS. The technology enables a single type of storage device to be mated with a variety of HMSs, and autonomously adapt so as to establish and facilitate streaming data communications with the particular mated HMS. This enables a single storage device design to be utilized throughout a network of dissimilar HMSs.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
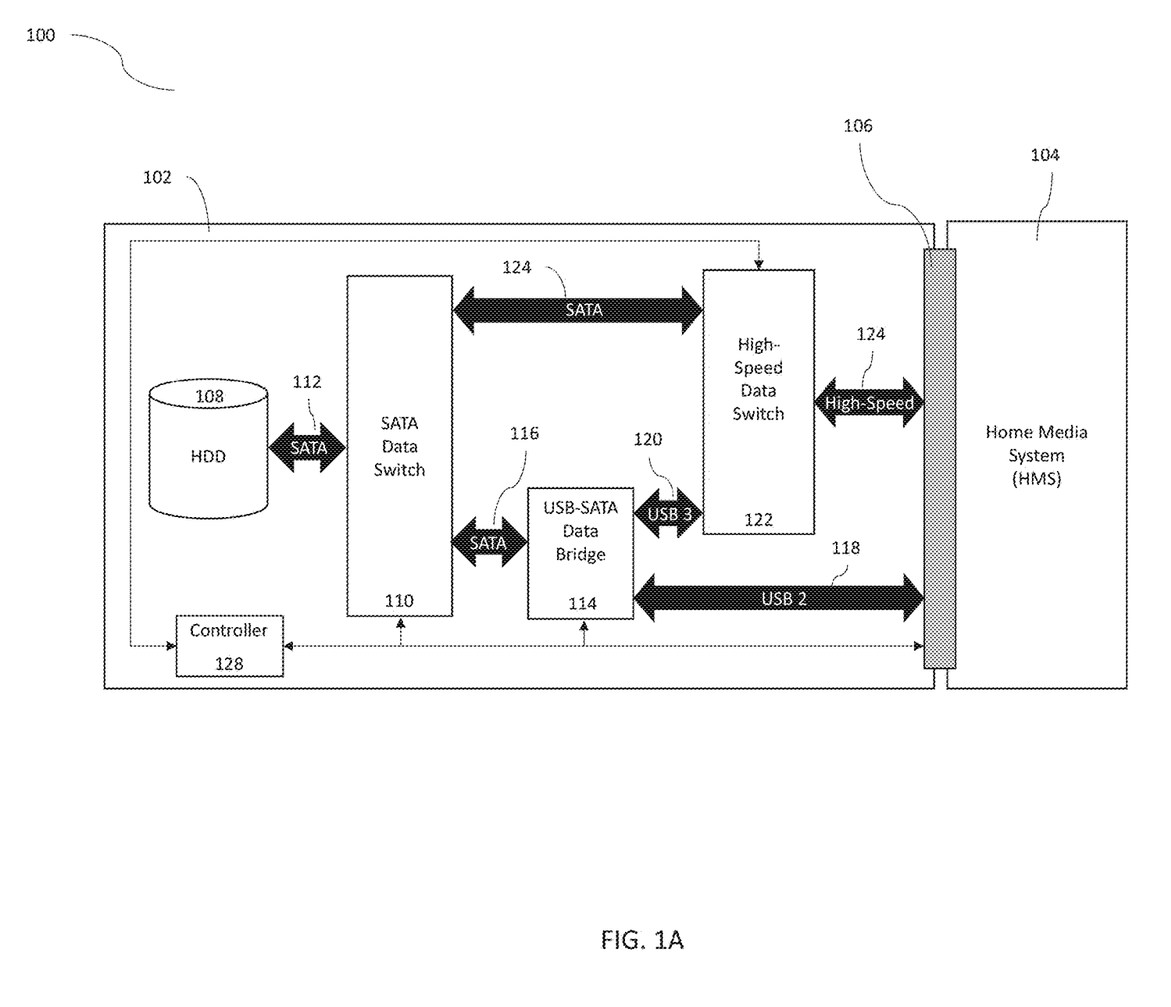
FIG. 1A is a functional diagram of a first preferred embodiment of a system supporting an adaptive storage media interface.

FIG. 1A is a functional diagram of a system (100) including storage device 102 and HMS 104; linked by interface 106. The HMS 104 could be any appliance that provides an interface for media content, such as set-top box adapted to operate in conjunction with a cable, optical, satellite or broadband network.

As shown, storage device 102 comprises hard disc drive 108, which is connected to SATA Data Switch 110 by SATA bus 112. SATA Data Switch 110 is linked to USB-SATA bridge 114 by SATA bus 116. USB-SATA bridge 112 converts data between SATA protocol and USB 2 and USB 3 protocols (bus 118 and bus 120, respectively), thereby providing a link between the USB busses (118, 120) and SATA bus 112. High-Speed Data switch 122 serves to route data between High-Speed Data bus 124 (which can support data conforming to either the SATA or USB 3 protocols) and both SATA Data Switch 110 and USB-SATA Data Bridge 114. SATA data is routed via bus SATA data bus 124, and USB 3 data is routed USB 3 bus 120.

Controller 128 automatically detects the type of data connections supported by HMS 104 via interface 106 and generates appropriate instructions for SATA Data Switch 110, USB-SATA Data Bridge 114 and High-Speed Data Switch 122 so as to convert and route data accordingly between HDD 108 and HMS 104, without any user input or intervention.

Figure 1B:
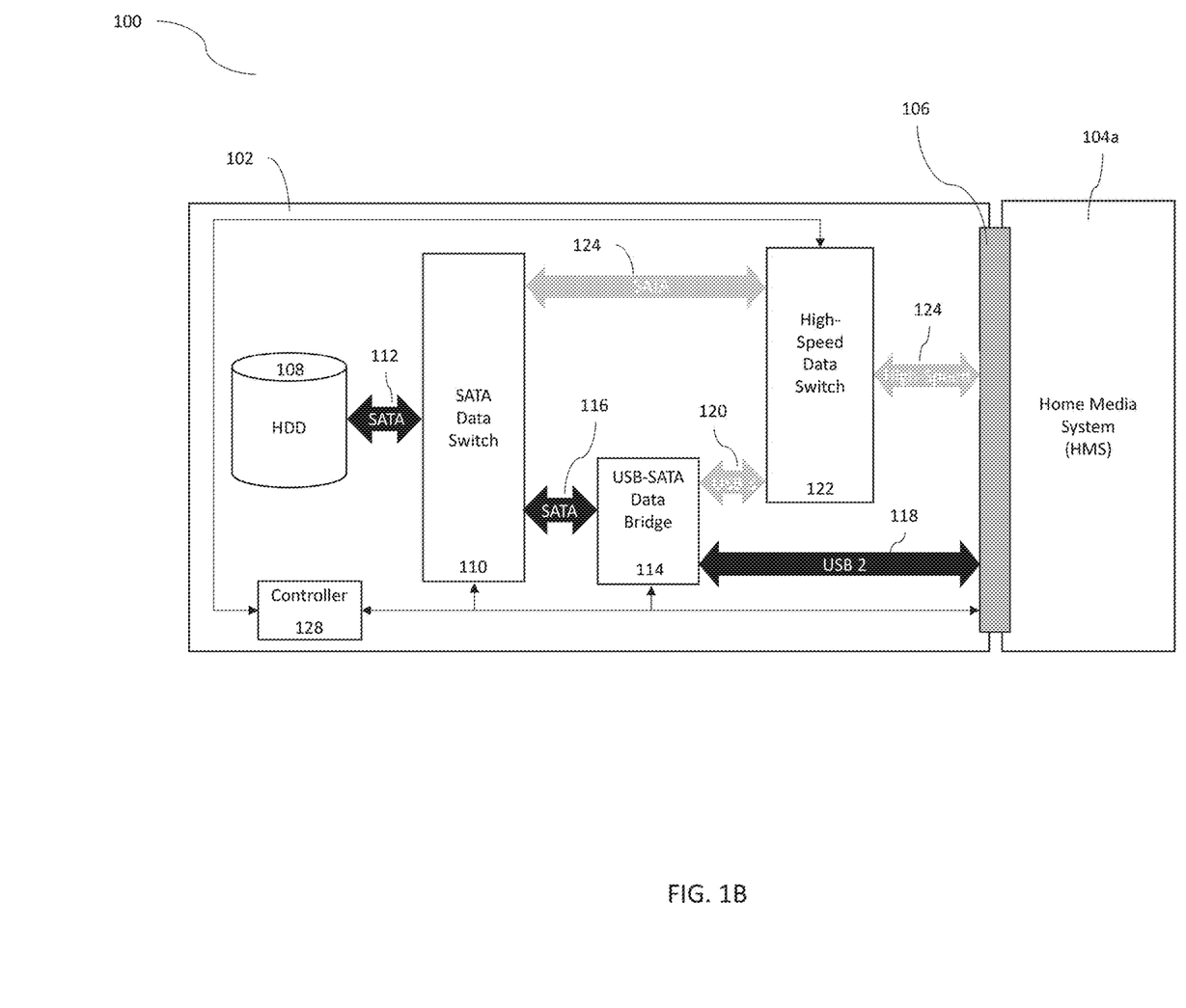
FIG. 1B is a functional diagram of a first preferred embodiment of a system supporting an adaptive storage media interface to an HMS utilizing USB 2 data protocol.

FIG. 1B illustrates the operation of storage device 102 when interface 106 is mated with a HMS 104a, a device that exclusively utilizes USB protocols to facilitate data communication with a storage device. Upon mating storage device interface 116 with HMS 104a (step 202, see FIG. 2), controller 128 the detects that HMS 104a utilizes USB protocol for data communication (an affirmative outcome of step 204). Controller 128 then tests to see if HMS 104a supports USB 3 data protocols (see step 206). In this case, HMS 104a does not support USB 3 and the process continues with step 208. In step 208 controller 128 configures USB-SATA Bridge 114 to provide a link between USB 2 bus 118 and SATA bus 116. Controller 128 then establishes a data path from HDD 108 to interface 106 via SATA Data Switch 110 and USB-SATA Data Bridge 114 (step 210). This enables data to stream between HDD 106 and HMS 104a. The process then terminates with step 212.

Figure 1C:
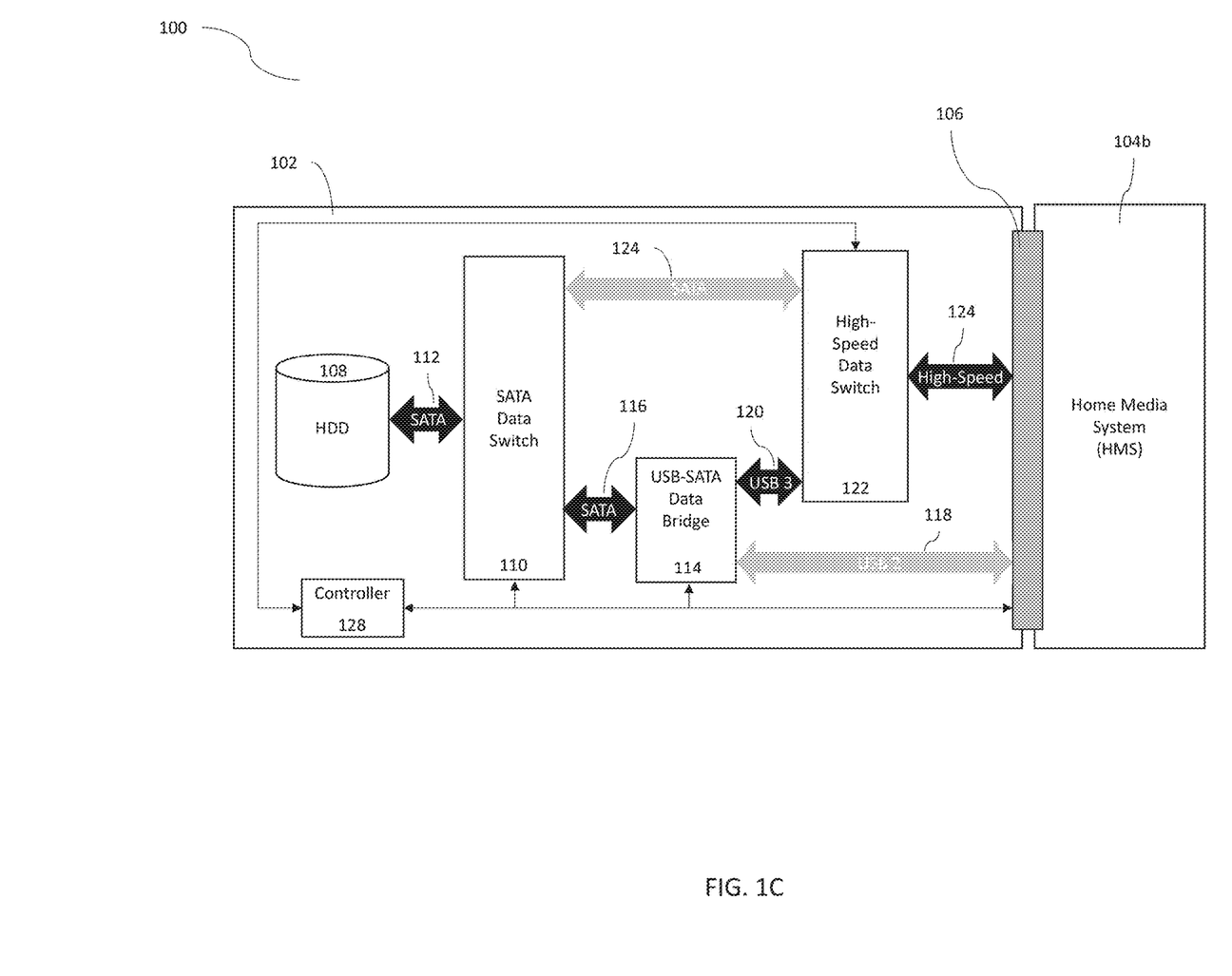
FIG. 1C is a functional diagram of a first preferred embodiment of a system supporting an adaptive storage media interface to an HMS utilizing USB 3 data protocol.
Figure 2:
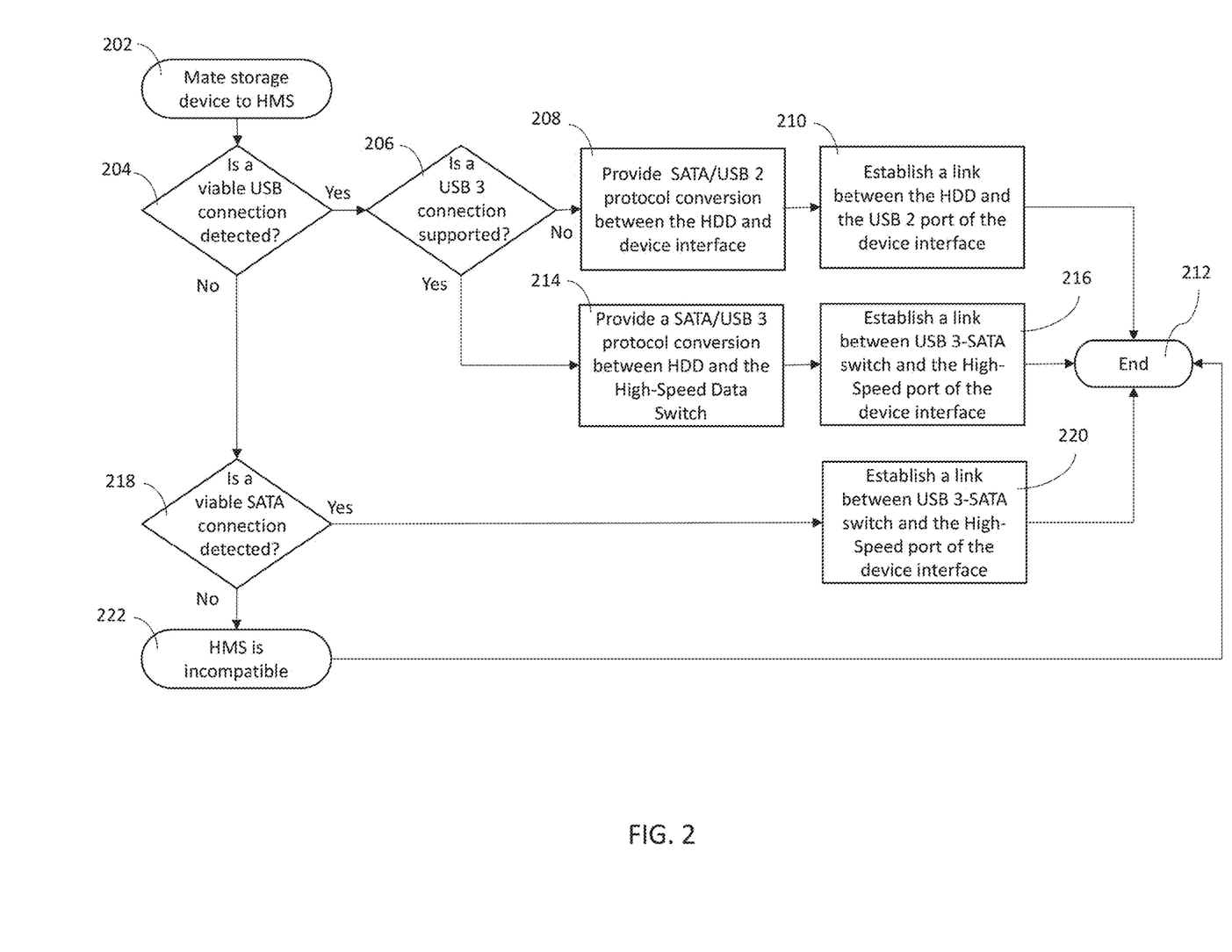
FIG. 2 is a flow diagram of operational steps executed within the system of FIGS. 1B-D.

An alternate mode of operation is illustrated in FIG. 1C. As shown, storage device 102 is mated with a HMS 104b, a device that exclusively utilizes USB protocols to facilitate data communication with a storage device, but supports USB 3 protocols (unlike HMS 104a). Upon mating storage device interface 116 with HMS 104a (step 202, see FIG. 3), controller 128 the detects that HMS 104a utilizes USB protocol for data communication (an affirmative outcome of step 204). Controller 128 then tests to see if HMS 104a supports USB 3 data protocols (see step 206). In this case, HMS 104b does support USB 3 and the process continues with step 214. In step 214 controller 128 configures USB-SATA Bridge 114 to provide a link between USB 3 bus 120 and SATA bus 116. Controller 128 then establishes a data path from HDD 108 to interface 106 via SATA Data Switch 110, USB-SATA Data Bridge 114 and High-Speed Data Switch 122 (step 216). This enables data to stream between HDD 106 and HMS 104a. The process then terminates with step 212.

Figure 1D:
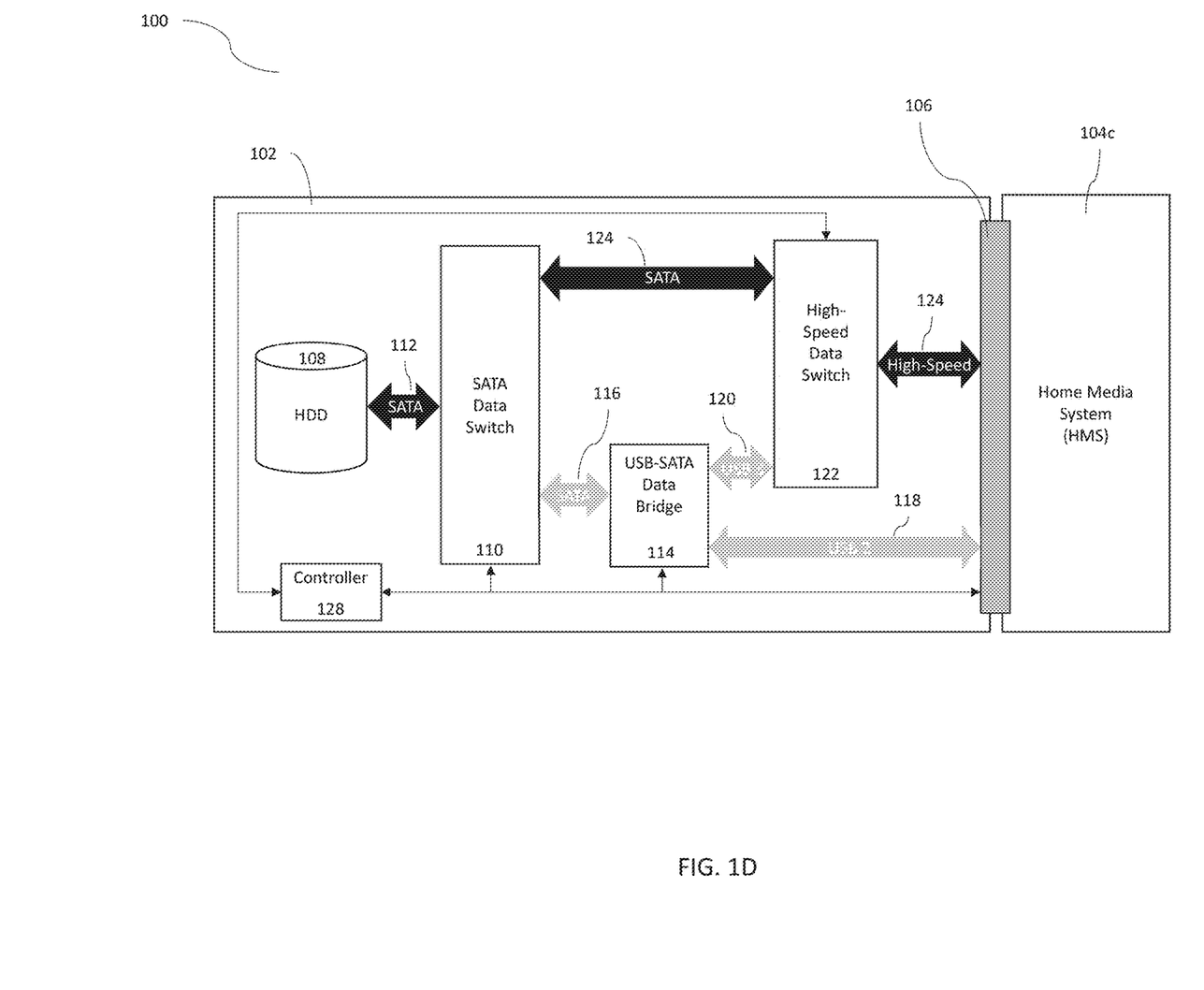
FIG. 1D is a functional diagram of a first preferred embodiment of a system supporting an adaptive storage media interface to an HMS utilizing SATA data protocol.

Yet another mode of operation of system 100 is illustrated in FIG. 1D. As shown, storage device 102 is mated with a HMS 104c, a device that exclusively utilizes SATA protocols to facilitate data communication with a storage device. Upon mating storage device interface 116 with HMS 104c (step 202, see FIG. 3), controller 128 the detects that HMS 104c utilizes SATA protocol for data communication (an affirmative outcome of step 218), and the process continues with step 220. In step 220 controller 126 configures High-Speed Data Switch 122 and SATA Data Switch 110 to establish a path between High-Speed bus 124 and SATA bus 112. This enables data to stream between HDD 106 and HMS 104a. The process then terminates with step 212.

If steps 402 and 404 of FIG. 2 all resulted in negative outcomes, the HMS would be deemed incompatible with storage device (102) (see step 222) and the process would terminate (step 212). No data connections would be established.

If in any of the above examples, a viable USB or SATA connection between storage device interface (116) and an HMS is recognized then appropriate protocol "handshake" or initiation sequence between the interface and the mated HMS is completed. Such handshakes/sequences are defined within each of the protocols and are well-known in the art. The recognition of the availability of a particular type of protocol connection could also be accomplished by a means unrelated to the particular protocols, such as the establishment of a connection to a particular contact or contacts upon the HMS, provided for the express purpose of identifying a particular data protocol. The invention is not limited by the particular system or method employed to recognize a given HMS protocol. Nor is it limited by the particular components utilized to convert data streams from one protocol to another, or provide switchable paths between a storage media, such as an HDD, and a device interface. Such switching could be enabled by any suitable switching fabric that could be appropriately controlled by a processor or other means as a function of the particular protocol connection supported by a mated HMS.

Although the invention herein has been described with reference to particular embodiments, it is to be understood that these embodiments are merely illustrative of the principles and applications of the present invention. For example, the storage device was described as being an HDD in the above embodiments, but it could also be a solid-state drive storage device, a removeable disk or disk drive, a remote storage device accessible via a network (public, private, wired, wireless, the Internet, etc.). In addition, various functional aspects of the invention could be implemented via physical arrangements that might have varying degrees of integration. The entirety of the disclosed invention could be implemented within a monolithic system, or disparate discrete components without departing from the spirit and scope of the present invention as defined by the appended claims.

The invention claimed is:

1. A system for an adaptive interface for a storage media device, the adaptive interface comprising:
   at least one storage device configured to communicate utilizing a first data protocol including at least a Serial Advanced Technology Attachment (SATA) data protocol;
   at least one device interface configured to mate with a media device, and further configured to support a first data protocol connection including a SATA data protocol connection, a second data protocol connection including a first Universal Serial Bus (USB) protocol connection, and a third data protocol connection including a second USB protocol connection, where said first USB protocol connection and the second USB protocol connection are associated with respective first and second different USB protocols;
   a protocol bridge configured to enable the transmission of data between a system utilizing the first data protocol and a system utilizing at least one of a second data protocol and a third data protocol, said second data protocol and said third data protocol being different USB protocols;
   a switching fabric configured to establish a plurality of data paths linking the storage device and the at least one device interface; and
   a processor configured to:
      determine the type of communication protocol supported by the media device mated to the at least one device interface;
      instruct the protocol bridge to enable the transmission of data between a system utilizing the first data protocol and a system utilizing one of either the first or second data protocols based, at least in part, upon the determination of the type of communication protocol supported by the at least one storage device; and
      establish at least one data path linking the at least one storage device with the at least one device interface, wherein the at least one data path comprises the protocol bridge.

2. The system of claim 1 wherein the at least one of the first, second and third data protocols comprises at least one of the following:
   Universal Serial Bus 2 protocol;
   Universal Serial Bus 3 protocol; and
   Serial AT Attachment protocol.

3. The system of claim 1 wherein the media device comprises at least of the following:
   a home media system; and
   a set-top box.

4. The system of claim 1 wherein the at least one storage device comprises at least one of:
   a hard-disk drive;
   a solid-state drive;
   a network drive;
   a disk drive; and
   a removeable drive.

5. The system of claim 4 wherein the system for an adaptive interface for a storage media device is linked to the network drive by a network comprising at least one for:
- a public network;
- a private network;
- a wireless network;
- a wired network; and
- the Internet.

6. A system for an adaptive interface for a storage media device, the adaptive interface comprising:
- at least one storage device configured to communicate utilizing a first data protocol including at least a Serial Advanced Technology Attachment (SATA) data protocol;
- at least one device interface configured to mate with a media device, and further configured to support a first data protocol connection including a SATA data protocol connection, a second data protocol connection including a first Universal Serial Bus (USB) protocol connection, and a third data protocol connection including a second USB protocol connection, where said the first USB protocol connection and the second USB protocol connection are associated with respective first and second different USB protocols;
- a protocol bridge configured to enable the transmission of data between a system utilizing the first data protocol and a system utilizing at least one of a second data protocol and a third data protocol, said second data protocol and said third data protocol being different USB protocols;
- a switching fabric configured to establish a plurality of data paths linking the storage device and the at least one device interface; and
- a processor configured to:
  - determine the type of communication protocol supported by the media device mated to the at least one device interface; and
  - establish at least one data path linking the at least one storage device with the at least one device interface, wherein the at least one data path does not comprise the protocol bridge.

7. The system of claim 6 wherein the at least one of the first, second and third data protocols comprises at least one of the following:
- Universal Serial Bus 2 protocol;
- Universal Serial Bus 3 protocol; and
- Serial AT Attachment protocol.

8. The system of claim 6 wherein the media device comprises at least of the following:
- a media gateway device; and
- a set-top box.

9. The system of claim 6 wherein the at least one storage device comprises at least one of:
- a hard-disk drive;
- a solid-state drive;
- a network drive;
- a disk drive; and
- a removeable drive.

10. The system of claim 9 wherein the system for the adaptive interface for a storage media device is linked to the network drive by a network comprising at least one for:
- a public network;
- a private network;
- a wireless network;
- a wired network; and
- the Internet.

11. A method for an adaptive interface for a storage media device, in a system comprising:
- at least one storage device configured to communicate utilizing a first data protocol including at least a Serial Advanced Technology Attachment (SATA) data protocol;
- at least one device interface configured to mate with a media device, and further configured to support a first data protocol connection including a SATA data protocol connection, a second data protocol connection including a first Universal Serial Bus (USB) protocol connection, and a third data protocol connection including a second USB protocol connection, where said the first USB protocol connection and the second USB protocol connection are associated with respective first and second different USB protocols;
- a protocol bridge configured to enable the transmission of data between a system utilizing the first data protocol and a system utilizing at least one of a second data protocol and a third data protocol, said second data protocol and said third data protocol being different USB protocols; and
- a switching fabric configured to establish a plurality of data paths linking the storage device and the at least one device interface;
- the method comprising the steps of:
  - determining the type of communication protocol supported by the media device mated to the at least one device interface;
  - instructing the protocol bridge to enable the transmission of data between a system utilizing the first data protocol and a system utilizing one of either the first or second data protocols based, at least in part, upon the determination of the type of communication protocol supported by the at least one storage device; and
  - establishing at least one data path linking the at least one storage device with the at least one device interface, wherein the at least one data path comprises the protocol bridge.

12. The method of claim 11 wherein the at least one of the first, second and third data protocols comprises at least one of the following:
- Universal Serial Bus 2 protocol;
- Universal Serial Bus 3 protocol; and
- Serial AT Attachment protocol.

13. The method of claim 11 wherein the media device comprises at least of the following:
- a media gateway device; and
- a set-top box.

14. The system of claim 11 wherein the at least one storage device comprises at least one of:
- a hard-disk drive;
- a solid-state drive;
- a network drive;
- a disk drive; and
- a removeable drive.

15. The method of claim 14 wherein the system for an adaptive interface for a storage media device is linked to the network drive by a network comprising at least one for:
- a public network;
- a private network;
- a wireless network;
- a wired network; and
- the Internet.

16. A method for an adaptive interface for a storage media device, in a system comprising:

at least one storage device configured to communicate utilizing a first data protocol including at least a Serial Advanced Technology Attachment (SATA) data protocol;

at least one device interface configured to mate with a media device, and further adapted to support a first data protocol connection including a SATA data protocol connection, a second data protocol connection including a first Universal Serial Bus (USB) protocol connection, and a third data protocol connection including a second USB protocol connection, where said the first USB protocol connection and the second USB protocol connection are associated with respective first and second different USB protocols;

a protocol bridge configured to enable the transmission of data between a system utilizing the first data protocol and a system utilizing at least one of a second data protocol and a third data protocol, said second data protocol and said third data protocol being different USB protocols; and a switching fabric configured to establish a plurality of data paths linking the storage device and the at least one device interface;

the method comprising the steps of:

determining the type of communication protocol supported by the media device mated to the at least one device interface; and establishing at least one data path linking the at least one storage device with the at least one device interface, wherein the at least one data path does not comprise the protocol bridge.

17. The method of claim 16 wherein the at least one of the first, second and third data protocols comprises at least one of the following:
   Universal Serial Bus 2 protocol;
   Universal Serial Bus 3 protocol; and
   Serial AT Attachment protocol.

18. The method of claim 16 wherein the media device comprises at least of the following:
   a media gateway device; and
   a set-top box.

19. The method of claim 16 wherein the at least one storage device comprises at least one of:
   a hard-disk drive;
   a solid-state drive;
   a network drive;
   a disk drive; and
   a removeable drive.

20. The method of claim 19 wherein the system for an adaptive interface for a storage media device is linked to the network drive by a network comprising at least one for:
   a public network;
   a private network;
   a wireless network;
   a wired network; and
   the Internet.

* * * * *